United States Patent [19]
Barry et al.

[11] Patent Number: 5,293,644
[45] Date of Patent: Mar. 8, 1994

[54] SECONDARY ID USAGE IN A SUBFLEET CALL

[75] Inventors: Kevin P. Barry, Streamwood; Thomas J. Karbowski, Carol Stream; Russell J. Lund, Lake Zurich; Glenn K. Lubin, Schaumburg, all of Ill.; Steven Horvath, Salem, Oreg.

[73] Assignee: Motorola, Inc., Schaumburg, Ill.

[21] Appl. No.: 794,765

[22] Filed: Nov. 18, 1991

[51] Int. Cl.⁵ .................... H04B 7/00; H04B 17/02
[52] U.S. Cl. .................... 455/38.1; 455/54.1; 455/186.1
[58] Field of Search .............. 455/38.1, 38.2, 38.3, 455/38.4, 38.5, 53.1, 54.1, 54.2, 56.1, 186.1; 379/58, 59, 60, 63

[56] References Cited
U.S. PATENT DOCUMENTS

| | | | |
|---|---|---|---|
| 4,517,561 | 5/1985 | Burke et al. | 455/38.5 |
| 4,517,669 | 5/1985 | Freeburg et al. | |
| 4,519,068 | 5/1985 | Krebs et al. | |
| 4,636,791 | 1/1987 | Burke et al. | 455/38.4 |
| 4,701,944 | 10/1987 | Howard et al. | |
| 4,723,264 | 2/1988 | Sasuta et al. | |
| 4,817,190 | 3/1989 | Comroe et al. | |
| 5,010,547 | 4/1991 | Johnson et al. | |
| 5,014,345 | 5/1991 | Comroe et al. | 455/186.1 |

Primary Examiner—Reinhard J. Eisenzopf
Assistant Examiner—Lisa Charouel
Attorney, Agent, or Firm—Susan L. Lukasik; Steven G. Parmelee

[57] ABSTRACT

A communications system provides subfleet calls for both voice and data communications using a secondary identification (301, 303, 305, 307, 309) incorporating a plurality of subfleets in a hierarchical arrangement. A message including the secondary identification (301, 303, 305, 307, 309) is transmitted to a communication unit (117) having a stored secondary identification (301, 303, 305, 307, 309). If the transmitted secondary identification sufficiently matches the stored secondary identification, the communication unit (117) responds to the instructions in the transmitted message.

19 Claims, 4 Drawing Sheets

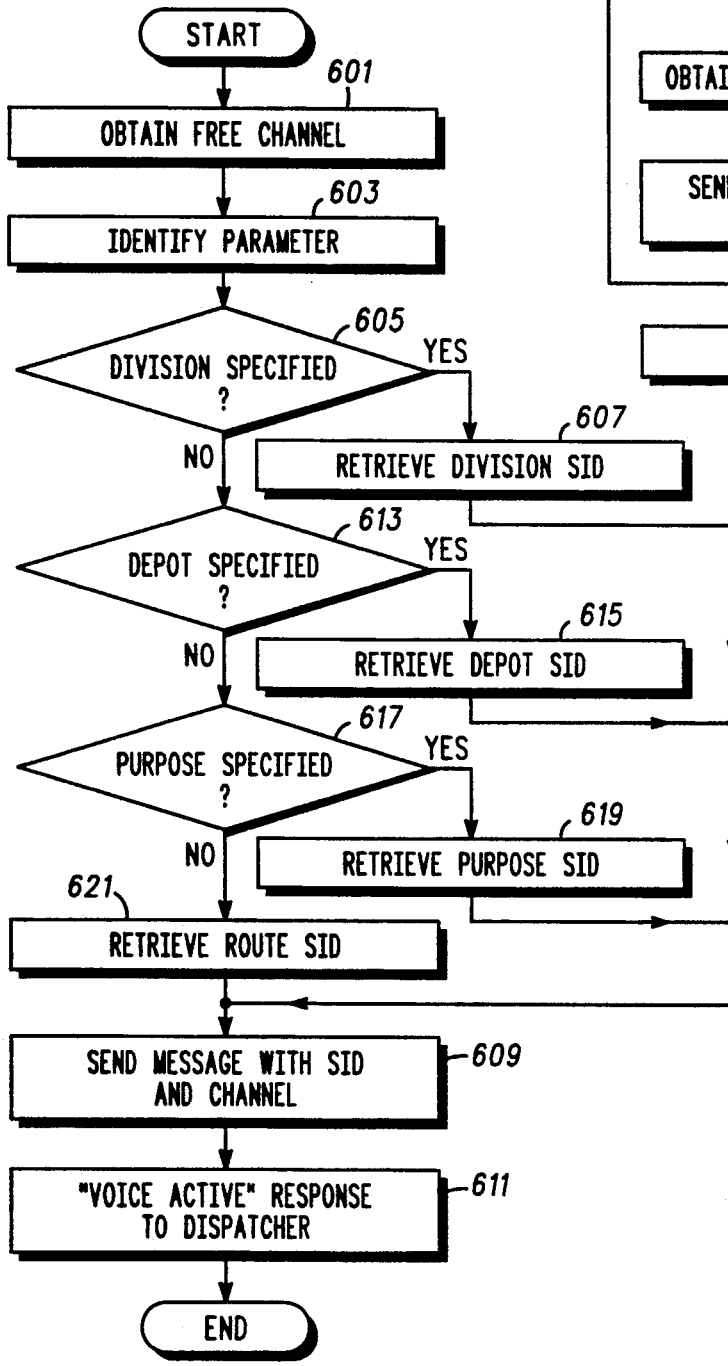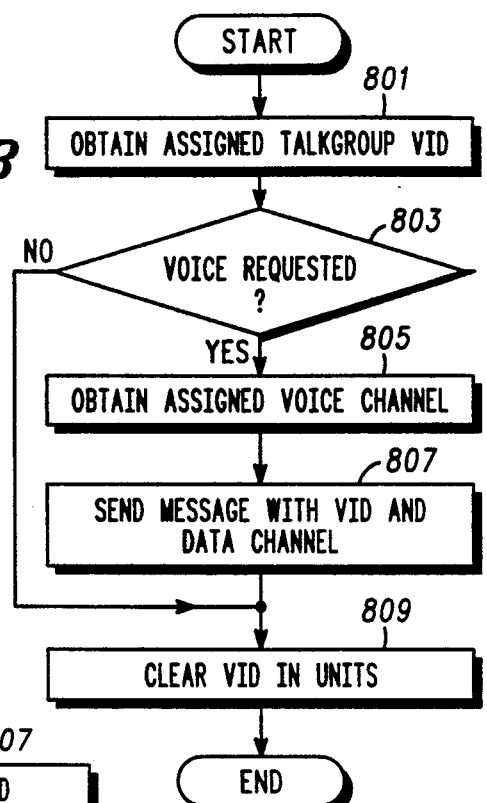

SECONDARY ID USAGE IN A SUBFLEET CALL

FIELD OF THE INVENTION

This invention relates to communications, including but not limited to subfleet calls with secondary identifications in a communication system.

BACKGROUND OF THE INVENTION

Many conventional RF communications systems exist. Users within these systems select a channel (if there is more than one channel available), monitor the channel for activity, and transmit when no one else is using the channel. Communication units within these systems include mobile and portable radios, capable of voice and/or data transmission. Some systems are very large, such as a public transportation operation. Such systems may include units in buses, trains, tow trucks, snowplows, security vehicles, and depots. In a large city, these vehicles and buildings are spread out over a large area. For example, each city may have ten divisions. Each division may have twenty to thirty depots. Each depot will have numerous tow trucks, snowplows, security vehicles, and buses or trains. These vehicles are dispersed among various bus routes or train routes near the depot.

When making a transmission on a large conventional system, usually all users will hear that transmission. Since only rare transmissions require all users to hear the transmission, many are bothered because they must listen to a message they do not need to hear, and further they cannot use the system for their own needs. Such a call is also an inefficient use of spectral resources. Some conventional systems employ spectrally-limited connect tones, but these tones are limited in availability and take additional time to reach the user. It is therefore reasonable to expect that such a large system will convert to a more spectrally-efficient trunked communications system, which provides fleet calls to reach a specific group of users. Converting to a trunked system is extremely costly, however, and funding is difficult to obtain in public transportation operations.

Generally, within a trunked system, the many users are organized into fleets, subfleets or groups, and individuals. Each user has a fleet, group, and an individual indentification (ID) code to provide a mechanism enabling group or fleet calls. Over-the-air protocols are used to program certain parameters of communication units, such as frequency assignments or the ID field, without bringing each unit out of the field for servicing, saving weeks or months of lost communication time. Trunked systems are unable to provide group data messages, however, and a data message for multiple units must be sent individually to each unit, which is a spectrally inefficient procedure. Many trunked systems also require permission to regroup units as well as acknowledgments from each communication unit involved, an inefficient procedure.

A large organization, such as a public transportation operation, with a conventional system needs the ability to address only a select group of communication units without disturbing users that are not involved in that call.

A method of communication that enables a conventional system to efficiently provide subfleet calls for both voice and data communications is desired.

BRIEF DESCRIPTION OF THE DRAWINGS

FIG. 6 is a flowchart showing use of a secondary ID to make a group call in accordance with the invention.

FIG. 8 is a flowchart showing clearing of a variable ID in accordance with the invention.

DESCRIPTION OF A PREFERRED EMBODIMENT

The following describes a method and apparatus that enables an RF communication system to efficiently support subfleet calls for both voice and data communications. Use of a secondary ID (SID) and variable ID (VID) sustains over-the-channel reprogramming of the entire ID field, as well as efficient subfleet calls for voice and data communications, thus providing advantages of a trunked system as well as additional advantages not previously functional in a conventional RF communications system.

Figure 1:
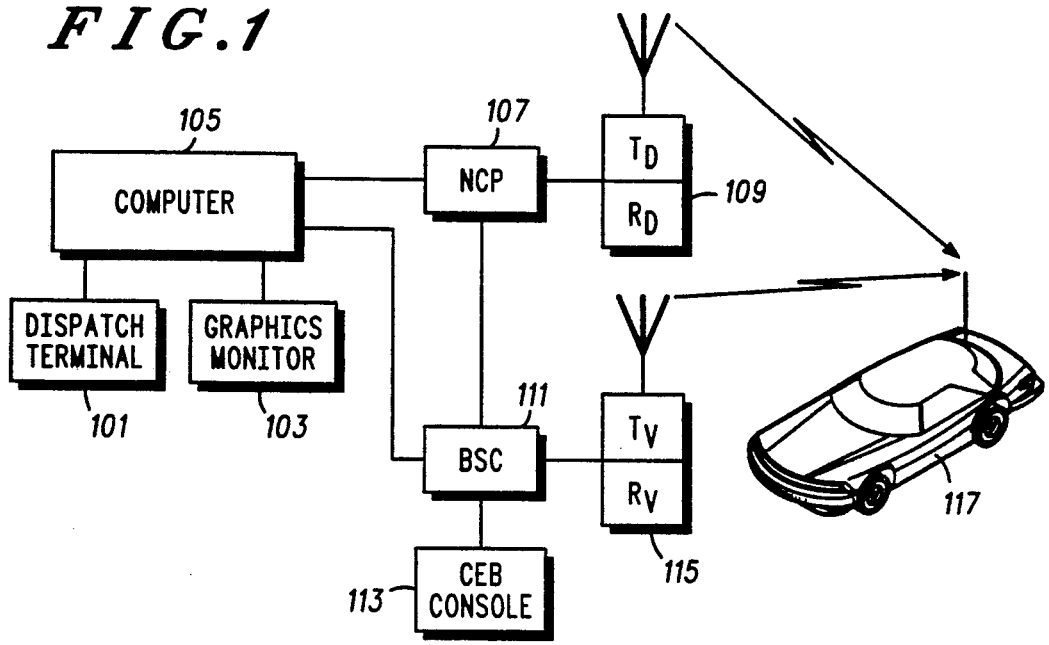
FIG. 1 is a block diagram of a communications system in accordance with the invention.

A block diagram of a communications system in accordance with the invention is shown in FIG. 1. A dispatch terminal 101 and graphics monitor 103 are coupled to a computer 105, such as a VAX 3900 with software package TDS-4500 available from Motorola, Inc., in order to provide a visual interface to the computer 105. Part of the function of the computer 105 is to perform the steps in the flowcharts in FIGS. 4, 5, 6, 7, and 8. The computer 105 is coupled to a Network Control Processor (NCP) 107, such as an NCP3000 available from Motorola, Inc., in order to seize and release a data communications base station 109. The data base station 109 handles a default data channel that is used to communicate ID programming and data commands within the system. The computer 105 is also coupled to a Base Station Controller (BSC) 111 in order to seize and release a voice communications base station 115. The BSC 111 is also connected to a Central Electronics Bank (CEB) with a console (CEB/console) 113. Communication resource interfaces for voice are maintained within the CEB. The console allows an operator to handle incoming and outgoing voice calls from a communication unit 117 on the communication resources. Each communication unit 117 (unit for short) has a unique individual or primary ID, as is known in the art. One data base station, one voice base station, and one communication unit are shown for simplicity of the drawing. The invention will work with one or more data base stations and one or more voice base stations. In the preferred embodiment of the invention, the unit 117 is a Keyboard Display Terminal, such as a MCT4800 available from Motorola, Inc., attached to a trunked mobile, such as a Spectra Mobile with data option available from Motorola, Inc., and is capable of both data and voice transmissions.

Figure 2:
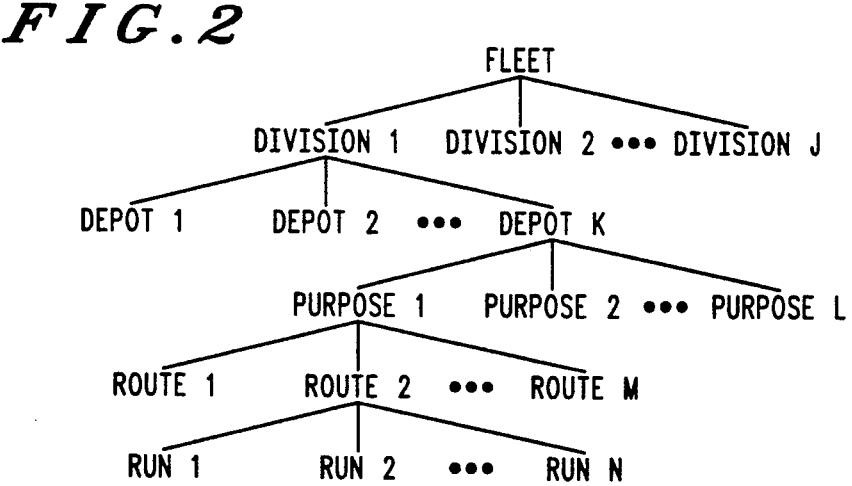
FIG. 2 is a diagram showing a partitioning of a fleet into subfleets in accordance with the invention.

A diagram showing a partitioning of a fleet into subfleets is shown in FIG. 2. This fictious example shows how a fleet of communication units in a public transportation service may be divided. The entire fleet is divided into J (an integral number) divisions, such as East, Near North, Southwest, and so forth. Each division is divided into depots, such as Pershing and Archer. In this instance, there are K (an integral number) depots in division 1. Each depot is divided into purposes, such as buses, snowplows, tow trucks, security and so forth. There are L (an integral number) purposes in the Kth depot in this example. Each purpose is associated with a route, such as 35th Street, Michigan Avenue, State Street, Madison Street, and so forth. The first purpose has M (an integral number) routes associated with it. Each route may be further divided into as many as N (an integral number) runs, such as 8:30 a.m., 9:00 a.m., 10:00 p.m., and so forth. Each division, depot, purpose, and route is considered a subfleet. Although a public transportation service was shown in this example, the subfleets may be applied to taxi services, airlines, government agencies, or any large fleet. The names of the subfleets (e.g., division, depot, purpose, route, and run) are unimportant as long as the hierarchy of the subfleets is retained.

A unit is record is kept for each subscriber unit in the computer 105. The unit record includes the division group ID, depot group ID, purpose group ID, and route group ID, which integrates the run. The computer 105 also keeps a table of group IDs along with the common name (alias) associated with the group ID. For example, the group ID for the Southwest division may be F8FF FFFF$_H$ (numbers designated with an "H" subscript are hexadecimal). The Pershing depot group ID may be FF4F FFFF$_H$. The purpose of tow truck may have a group ID of FFF5FFFF$_H$. The group ID of the Michigan Avenue route may be FFFF 1BC3$_H$. Each common name is unique within the fleet and has only one group ID associated with it. For ease of entry into the computer 105, each common name has an abbreviated form.

Figure 3:
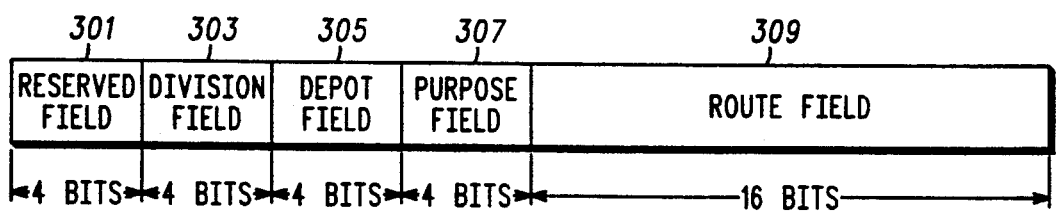
FIG. 3 is a bit field representation of a secondary ID format in accordance with the invention.

A bit field representation of a secondary ID (SID) format is shown in FIG. 3. The 32 binary bits are divided into five groups. The entire SID is F845 1BC3$_H$ for the example in the previous paragraph. A reserved field 301 contains 4 bits, usually $F_H$, and fills the SID so that it contains four full bytes (32 bits) of information. A division field 303 contains the 4 bits that designate the division, such as $8_H$ for the Southwest division in the previous paragraph. A depot field 305 contains the 4 bits that designate the depot, such as $4_H$ for the Pershing depot in the previous paragraph. A purpose field 307 contains the 4 bits that designate the purpose, such as $5_H$ for the tow truck purpose in the previous paragraph. A route field 309 contains the 16 bits that designate the route, such as 1BC3$_H$ for the Michigan Avenue route in the previous paragraph.

When using an SID, the target audience may be, for example, a particular division, such as the Southwest division in the previous example. The SID employed, F8FF FFFF$_H$, includes the division field for the Southwest division, $8_H$, and the remainder of the SID is filled in with the wild card $F_H$. In the preferred embodiment, no field in FIG. 3 uses $F_H$ to designate any field, such a division field 303, depot field 305, purpose field 307, or part of a route field 309, which has up to four $F_H$ designations. Thus, when a unit receives an $F_H$ in a field, the $F_H$ acts as a wild card, and the unit assumes a match for that field. Hence, sending the F8FF FFFF$_H$ SID will place an effective subfleet call to any unit having $8_H$ in the division field of its SID. Similarly, specifying F8F5 FFFF$_H$ as the SID will place an effective subfleet call to all tow-trucks in the Southwest division, where $5_H$ is the purpose field for tow-trucks. This matching technique for SIDs allows a single SID to cover a large number of different subfleets without having to redefine subfleets except on a rare occasion (excluding, of course, route changes).

Combining the hierarchical subfleets of the SID with the wild card ability as described creates a highly flexible mechanism for providing channel-efficient subfleet and multiple-subfleet calls. Regrouping of the communication units on a regular basis is not required. Each unit belongs to various different subfleets that are easily reached with a single command, thus providing more efficient channel usage than a trunking system, which often requires permission to regroup and needs several transmissions to create the same effect on the system. System traffic is reduced because acknowledgments from each unit of a group are not required, resulting in increased throughput ability for the system.

Figure 4:
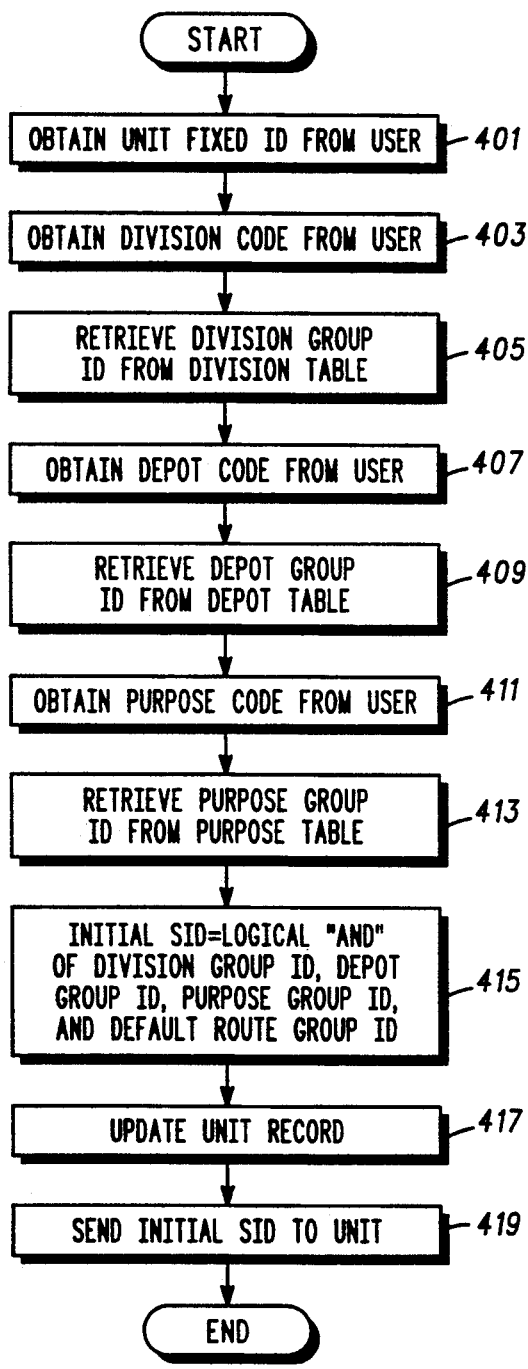
FIG. 4 is a flowchart showing programming of an initial secondary ID into a unit in accordance with the invention.

A flowchart showing programming of an initial SID is shown in FIG. 4. When a unit is programmed for the first time, it is given an initial SID, as follows. The computer obtains the fixed ID (the unique ID assigned to each unit) for the unit from the user at step 401. A division code for the unit is obtained from the user at step 403, and that division code is used to retrieve the division group ID from the division table at step 405. The division code is the abbreviation for the common name, such as SW for Southwest. The division table lists the division group ID for each division code in the fleet. A depot code for the unit is obtained from the user at step 407, and that depot code is used to retrieve the depot group ID from the depot table at step 409. The depot code is the abbreviation for the common name, such as PE for Pershing. The depot table lists the depot group ID for each depot code in the fleet. A purpose code for the unit is obtained from the user at step 411, and that purpose code is used to retrieve the purpose group ID from the purpose table at step 413. The purpose code is the abbreviation for the common name, such as tow truck. The purpose table lists the purpose group ID for each purpose code in the fleet.

At step 415, the initial SID is computed as the logical "AND" of the division group ID, depot group ID, purpose group ID, and default route group ID (FFFF 0000$_H$). For the example in the previous paragraphs, the division group ID is F8FF FFFF$_H$, the depot group ID is FF4F FFFF$_H$, and the purpose group ID is FFF5 FFFF$_H$. The logical "AND" of these numbers with the default route group ID is F845 0000$_H$. The unit record is updated by the computer at step 417, and the initial SID is sent to the unit using its fixed ID at step 419 to complete the process of programming the initial SID into the unit. If it is desired to change the division, depot, and/or purpose of the unit, the steps in the flowchart of FIG. 4 are repeated using the appropriate new codes from the user to provide the new initial SID.

Figure 5:
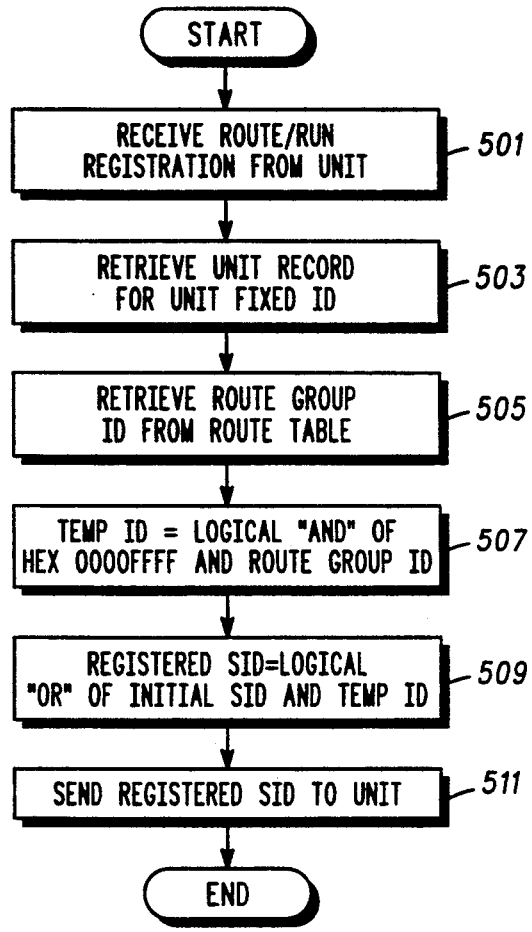
FIG. 5 is a flowchart showing programming of a registered secondary ID into a unit in accordance with the invention.

A flowchart showing programming of a registered SID into a unit is shown in FIG. 5. Since route information may change on a daily or even an hourly basis, each time the unit's route changes the route group ID for the SID is entered by the user, which triggers automatic reprogramming of the unit's SID. The initial SID is combined with the route information to form the registered SID as follows. The unit transmits its route/run registration as a route code to the computer at step 501. The unit record for the fixed ID of this unit is retrieved at step 503. The route code is used to retrieve the route group ID from the route table at step 505. The route code is the abbreviation for the common name, such as MA for Michigan Avenue. The route table lists the route group ID for each route code in the fleet. At step 507, the Temp ID is set to the logical "AND" of 0000 $FFFF_H$ and the route group ID, for example FFFF $1BC3_H$, at step 507. For the example above, 0000 $FFFF_H$ and FFFF $1BC3_H$ are ANDed, resulting in a Temp ID of 0000 $1BC3_H$.

At step 509, the registered SID is calculated by taking the logical "OR" of the initial SID (from step 415 of FIG. 4) and the Temp ID (from step 507). In the above example, the initial SID from step 415 is F845 $0000_H$, which when ORed with 0000 $1BC3_H$ results in a registered SID of F845 $1BC3_H$. At step 511, the registered SID is sent to the unit using its fixed ID, completing the programming of the route in unit. The procedure in FIG. 5 is repeated each time the unit changes its route/run. The ability to program the entire SID is provided between the flowcharts in FIG. 4 and FIG. 5.

A flowchart showing use of an SID to make a group call is shown in FIG. 6. At step 601, a free (unallocated) channel is obtained. A subfleet parameter indicating the subfleet (division, depot, purpose, or route) for which the communication is intended is selected by the dispatcher and is obtained, in the form of a code (e.g., division code), and identified by the computer 105 at step 603, as previously described. If the code specifies a division at step 605, the division group ID (division SID) is retrieved from the division table at step 607, and the procedure continues with step 609. If the code specifies a depot at step 613, the depot group ID (depot SID) is retrieved from the depot table at step 615, and the procedure continues with step 609. If the code specifies a purpose at step 617, the purpose group ID (purpose SID) is retrieved from the purpose table at step 619, and the procedure continues with step 609. If the code does not specify a purpose at step 617, the route group ID (route SID) is retrieved from the route table at step 621, and the procedure continues with step 609. At step 609, a message is sent on the default data channel, as described for FIG. 1, telling the units to go to the voice channel obtained at step 601. This message includes the SID obtained in step 607, 615, 619, or 621. The units receiving this message with this SID will automatically tune to the specified channel, without disturbing the user. A "voice active" response is sent to the dispatcher at step 611, to inform the dispatcher that communications are set up for the desired message.

A variable ID (VID) is used to make a call to two or more subfleets and/or individuals. A variable ID is first assigned to each subfleet and/or individual. When all of the subfleets and/or individuals desired for communication have the same VID assigned to them, a free channel is obtained, and a message can be sent to all units with the assigned VID without any operator having to manually switch channels. Use of VIDs enables quick regrouping of subfleets and/or individuals without actually forming a group. Once the dispatcher designates intent to make a multiple-subfleet call, the same VID is sent to each subfleet or individual specified without forming a group. Any unit having a stored VID responds to a message sufficiently matching that stored VID, regardless of the SID stored within the unit.

The usefulness of the VID is shown in the following example. A Michigan Avenue bus is involved in an accident in the intersection of Michigan Avenue and Madison Street. The bus driver calls in the accident to the dispatcher operating the CEB/console 113. The dispatcher requests a free voice channel and then uses the dispatch terminal 101 to put the same VID on all security vehicles from the Southwest depot, and buses and tow trucks on the Madison Street and Michigan Avenue routes. When the "voice active" response is received by the dispatcher, his call is simultaneously received by only the security vehicles from the Southwest depot and the buses and tow trucks on the Madison Street and Michigan Avenue routes. Only units with the assigned VID will provide the communication to the operator. The dispatcher verbally tells all of the vehicle operators where the accident is and what route to use to avoid the intersection. The dispatcher requests that each tow truck submit its current location and availability to tow away the damaged bus. The security vehicles are dispatched to make sure the situation remains under control. The dispatcher then sends a single message to all the units with the VID telling the units to automatically revert to the default VID that squelches the radio on incoming calls. How the computer accomplishes the handling of these calls is shown in FIG. 7 and FIG. 8.

Figure 7:
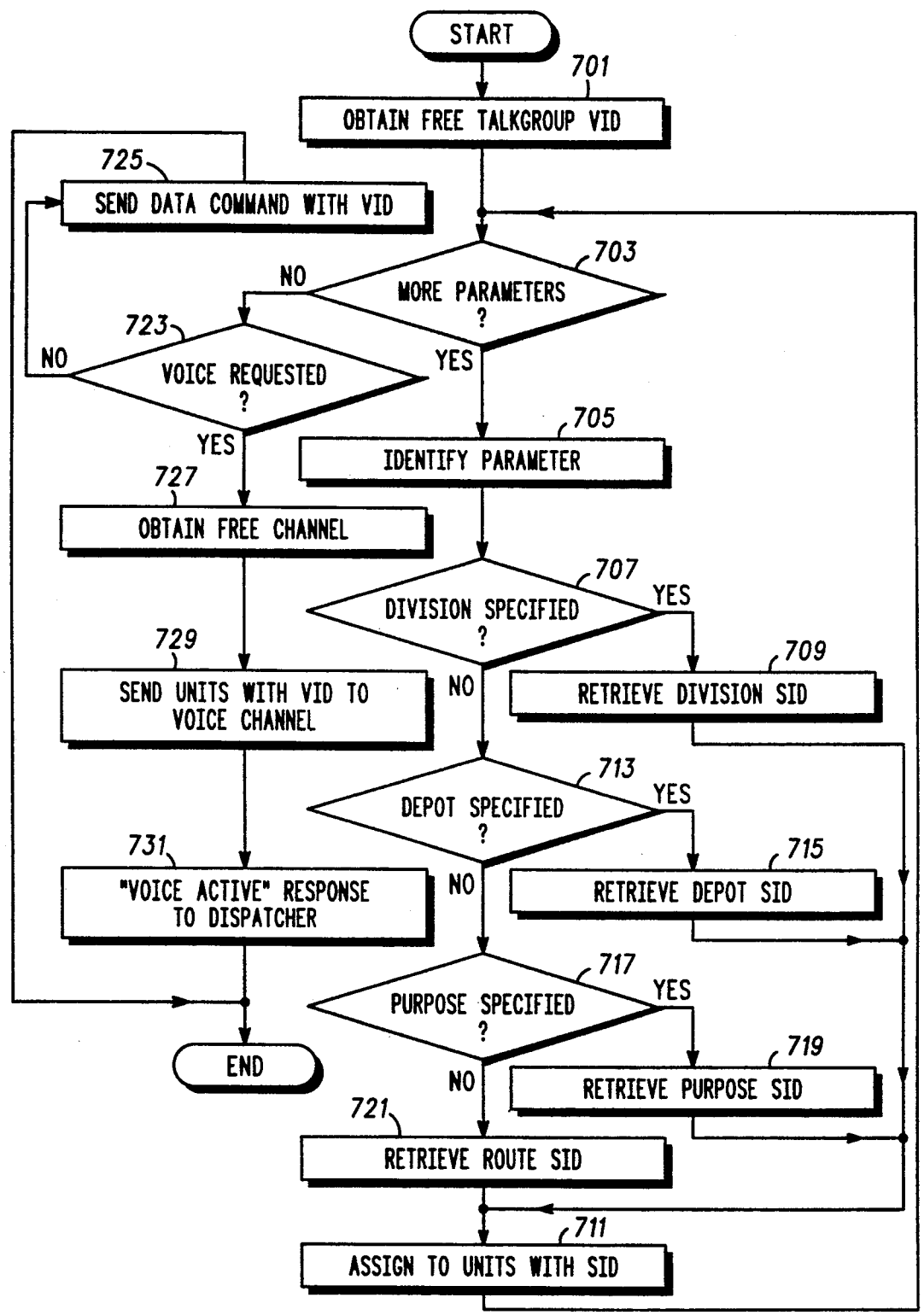
FIG. 7 is a flowchart showing use of a secondary ID and a variable ID to make a multi-group call in accordance with the invention.

A flowchart showing use of an SID and a VID to make a multigroup call is shown in FIG. 7. At step 701, a free (unallocated) VID is obtained. If the dispatcher selects a subfleet parameter for this VID at step 703, the process continues with step 705. The selected subfleet parameter indicates the subfleet (division, depot, purpose, or route) for which the communication is intended and is obtained, in the form of a code (e.g., division code), and identified by the computer 105 at step 705, as previously described. If the code specifies a division at step 707, the division group ID (division SID) is retrieved from the division table at step 709, and the procedure continues with step 711. If the code specifies a depot at step 713, the depot group ID (depot SID) is retrieved from the depot table at step 715, and the procedure continues with step 711. If the code specifies a purpose at step 717, the purpose group ID (purpose SID) is retrieved from the purpose table at step 719, and the procedure continues with step 711. If the code does not specify a purpose at step 717, the route group ID (route SID) is retrieved from the route table at step 721, and the process continues with step 711.

At step 711, a message is sent on the default data channel telling the units to change their VID to the VID obtained at step 701. This message includes the SID obtained in step 709, 715, 719, or 721. The process then continues with step 703. If the dispatcher does not select a subfleet parameter for this VID at step 703, the process continues with step 723. If at step 723 a voice channel is requested by the dispatcher via the computer 105, a free (unallocated) voice channel is obtained at step 727. At step 729, a message is sent on the default data channel, including the VID obtained in step 701 and a command telling the units with the VID to go to the voice channel obtained in step 727. A "voice active" response is sent to the dispatcher at step 731, to inform the dispatcher that voice communications are set up for the desired message, and the process ends. In other words, the dispatcher can transmit voice to the units in the subfleet selected in steps 703 through 711. If at step 723 a voice channel is not requested, i.e., a data command was entered by the dispatcher into the computer 105, a message including the data command and the VID obtained in step 701 is sent over the default data channel to the units at step 725, and the process ends.

Although it is not shown in the flowchart, an individual unit may be assigned a VID by including the primary ID of the unit, rather than an SID, with a message assigning a VID, as in step 711 of FIG. 7. A separate subfleet need not be created for a unit to assign a VID to that unit, thus saving time and channel space to make a call with a VID.

In the preferred embodiment, the units use the default data channel to receive all commands relating to a change of SID or VID, and any data communications. If the dispatcher has completed a voice communication, the units are sent back to the default data channel for further instructions. The VID must also be cleared to allow other units to use that VID. A VID may be partially cleared, such that certain units retain the VID for a subsequent message, such as a message designated only for security or management operations.

A VID remains in a unit until it is changed or cleared, as shown in FIG. 8, which is a flowchart showing clearing of a variable ID, as well as commands to return units to the voice channel. This process may be initiated by the dispatcher or after a time-out deemed sufficient for the system. At step 801, the talkgroup VID that was last assigned for the last communication is obtained. If a voice channel was requested when that VID was last obtained for a communication, the process continues with step 805, otherwise it continues with step 809. The previous voice channel is again obtained at step 805. At step 807, a message including the VID is sent to tell the units to return to the default data channel. At step 809, a message is sent on the default data channel telling those units with this VID to clear the VID and wait for further instructions.

In the preferred embodiment, each unit receives all transmissions that are sent. The unit compares the appropriate SID or VID received in the transmission to the current SID or VID that is stored in the unit. If the SIDs match sufficiently, i.e., all the digits of the SID match or a number of digits match that is assessed to be sufficient for a match, including wild cards, then the remainder of the message is accepted by the unit, which then responds according to any instructions in the message, such as turning to a specific channel, storing data, unsquelching, and so forth. Similarly, if the VIDs match sufficiently, i.e., all the digits of the VID match or a number of digits match that is assessed to be sufficient for a match, then the remainder of the message is accepted by the unit, which then responds according to any instructions in the message. If a message is not intended for the unit, the unit simply ignores the message.

The unit operates in the normal conventional manner in transmit mode, although a user can call dispatch to request a group call. The dispatcher sends a command telling the appropriate units as well as the requesting user to go to a voice channel to receive a voice call, where the dispatcher verbally informs the requesting user that the call is set up. The requesting user then transmits as in a normal conventional call, except that only the desired listeners happen to be pre-tuned to the channel.

Use of SIDs and VIDs on the default data channel to send programming and subfleet call information provides an efficient way to make subfleet calls for both voice and data. Switching of channels for communications is automatically done without delay or need for operator assistance. One brief message is sent on the default data channel to give an instruction to change channels or receive information without the operator having to intervene in the process. This does not unduly tie up the default data channel, since only one very brief data message is sent to each subfleet, and one additional message to give the subfleets instructions on where to find a subsequent call on a voice or data channel.

Establishing a subfleet call with a VID may only tie up the channel for a total time of one tenth of a second, but that one tenth of a second may be dispersed over the course of a minute, and is negligible. Using a normal conventional system, the channel time-out will have run its course in the first units by the time each unit in an entire fleet is told to switch to a voice channel, and the operator actually changes the channel. Under such conditions, the dispatcher may only be talking to an unknown subset of the desired calling audience. Further, transmission of an SID uses much less time than a typical conventional 200 ms connect tone. SIDs are reprogrammable over the air, and connect tones are not.

Subfleet calls to channel agile data units and voice units are provided using conventional channels, rather than channels in a trunked system, although the invention may easily be incorporated into a trunked system. Incorporating the present invention into a trunked system results in a more efficient channel usage within the trunked system. Permission to regroup is required, grouping and regrouping commands must be acknowledged, and reinforcing regroup commands are transmitted in many current trunked systems. These requirements are not channel efficient. No permission to regroup or acknowledgments to messages are required in the present invention, providing even more efficient use of the channel. Because a VID stays in the unit until changed, there is no need to send subsequent, channel-inefficient messages to reinforce the VID, which is an advantage, especially when such reinforcing messages could be lost in deep fades or under tunnels.

In the preferred embodiment, transmission of data is performed according to the protocols set forth in the following U.S. patents, which are incorporated herein by reference. U.S. Pat. No. 4,517,669 entitled "Method and Apparatus for Coding Messages Communicated Between a Primary Station and Remote Stations of a Data Communications System" as issued on May 14, 1985 to Thomas A. Freeburg et al.; U.S. Pat. No. 4,519,068 entitled "Method and Apparatus for Communicating Variable Length Messages Between a Primary Station and Remote Stations of a Data Communications System" as issued on May 21, 1985 to Jay Krebs et al.; and U.S. Pat. No. 4,636,791 entitled "Data Signalling System" as issued on Jan. 13, 1987 to Timothy M. Burke et al. These protocols provide an error correction scheme for all information transmitted, including the SID and VID fields.

What is claimed is:

1. A method for providing subfleet transmissions in a communication system, comprising the steps of: storing a secondary identification, wherein said secondary identification comprises a plurality of subfleets in a hierarchical arrangement and wherein said secondary identification reflects the hierarchial arrangement of said plurality of subfleets;

receiving a subfleet data transmission including a variable identification, said second identification and a command to store said variable identification;

storing said variable identification; and responding to a subsequent subfleet data transmission only when said subsequent subfleet data transmission includes one of said stored variable identification and said stored secondary identification.

2. The method of claim 1, wherein said message includes a command to go to a voice channel, further comprising the step of transmitting a message on said voice channel, said message including a command to go to a data channel.

3. The method of claim 1, further comprising the steps of:

transmitting a message including a new secondary identification and a command to store said new secondary identification; and replacing said stored secondary identification with said new secondary identification in said receiver.

4. The method of claim 1, further comprising the step of using a wild card technique to determine sufficient matching of said stored secondary identification.

5. A method for providing transmissions to at least two subfleets in a communication system with a plurality of communication units, comprising the steps of:

identifying at least two desired subfleets for a subfleet data transmission;

transmitting, responsive to said identifying step, a message to each of said at least two desired subfleets, said message incorporating a secondary identification pertaining to one of said at least two desired subfleets, wherein said secondary identification comprises a plurality of subfleets in a hierarchical arrangement;

transmitting with said messages to each of said at least two desired subfleets a variable identification and a command to store said variable identification;

receiving and storing said variable identification at a communication unit; and responding, by said communication unit, to a subsequent subfleet data transmission only when said subsequent subfleet data transmission includes one of said variable identification and said secondary identification stored in said communication unit.

6. The method of claim 5, further comprising the step of using a wild card technique to-determine sufficient matching of said stored secondary identification.

7. A method for providing transmissions to at least two subfleets in a communication system with a plurality of communication units, comprising the steps of:

identifying at least two desired subfleets for a subfleet voice transmission;

transmitting, responsive to said identifying step, a message to each of said at least two desired subfleets, said message incorporating a secondary identification pertaining to one of said at least two desired subfleets, wherein said secondary identification comprises a plurality of subfleets in a hierarchical arrangement;

transmitting with said messages to each of said at least two desired subfleets a variable identification and a command to store said variable identification;

receiving and storing said variable identification in a communication unit;

transmitting a third message with said variable identification and a command to go to a voice channel;

transmitting said subfleet voice transmission on said voice channel;

receiving said third message and said subfleet voice transmission at said communication unit; and responding, by said communication unit, to said subfleet voice transmission only when said subfleet voice transmission includes one of said variable identification and said secondary identification stored in said communication unit and tuning to said voice channel without operator intervention.

8. The method of claim 7, wherein said subfleet voice transmission is squelched when said variable identification is not stored in said communication unit.

9. The method of claim 7, further comprising the step of transmitting a data message on said voice channel, said data message including a command to go to a default data channel.

10. The method of claim 7, further comprising the step of transmitting a data message including a command to revert said stored variable identification to a default variable identification.

11. The method of claim 7, further comprising the step of using a wild card technique to determine sufficient matching of said stored secondary identification.

12. A communication unit able to receive subfleet transmissions in a communication system, the communication unit comprising: means for storing a secondary identification, wherein said secondary identification comprises a plurality of subfleets in a hierarchical arrangement and wherein said secondary identification reflects the hierarchial arrangement of said plurality of subfleets;

means for receiving a subfleet data transmission including a variable identification, said second identification and a command to store said variable identification;

means for storing said variable identification; and means for responding to a subsequent subfleet data transmission only when said subsequent subfleet data transmission includes one of said stored variable identification and said stored secondary identification.

13. The communication unit of claim 12, wherein said means for responding further comprises means for tuning to a voice channel when said subfleet data transmissions instruct so directs.

14. The communication unit of claim 12, further comprising means for triggering automatic reprogramming of at least part of said stored secondary identification.

15. The communication unit of claim 12, further comprising means for using a wild card technique to determine sufficient matching of said stored secondary identification.

16. The communication unit of claim 12, further comprising:

means for receiving a message including a new secondary identification and a command to store said new secondary identification; and means for replacing said stored secondary identification with said new secondary identification.

17. The communication unit of claim 12, further comprising means for tuning to a voice channel without operator intervention when said subsequent subfleet data transmission includes a command to go to said voice channel.

18. The communication unit of claim 12, further comprising means for tuning to a default data channel without operator intervention when said subsequent subfleet data transmission includes a command to go to said default data channel.

19. The communication unit of claim 12, further comprising means for reverting said stored variable identification to a default variable identification when said subsequent subfleet data transmission includes a command to revert to said default variable identification.

* * * * *